United States Patent
Schechter

Patent Number: 5,996,560
Date of Patent: Dec. 7, 1999

[54] UNTHROTTLED ENGINE OPERATION WITH A HEATED AIR CYCLE

[75] Inventor: Michael Moses Schechter, Farmington Hills, Mich.

[73] Assignee: Ford Motor Company, Dearborn, Mich.

[21] Appl. No.: 07/856,269

[22] Filed: Mar. 23, 1992

[51] Int. Cl.$^6$ .................................................. F02G 5/00
[52] U.S. Cl. ........................ 123/556; 123/348; 123/405
[58] Field of Search ............................... 123/90.11, 348, 123/556, 402, 405

[56] References Cited

U.S. PATENT DOCUMENTS

| | | | |
|---|---|---|---|
| 4,700,684 | 10/1987 | Pischinger et al. | 123/568 |
| 4,945,870 | 8/1990 | Richeson | 123/90.11 |
| 5,076,248 | 12/1991 | Schatz | 123/556 |

OTHER PUBLICATIONS

"Variable Valve Closure Timing for Load Control and the Otto Atkinson Cycle Engine" Saunders et al.; Mar. 1989, SAE. 890677.

"Controlling Engine Load by Means of Early Intake–Valve Closing", Tuttle; Feb. 1982, SAE 820408.

"The Otto–Atkinson Engine—A New Concept in Automotive Economy", Loria et al.; Feb. 1982, SAE 820352.

"Controlling Engine Load by Means of Late Intake–Valve Closing", Tuttle; 1980, SAE 800794.

*Primary Examiner*—Noah P. Kamen
*Attorney, Agent, or Firm*—Jerome R. Drouillard; Roger L. May

[57] ABSTRACT

A method of operating an automotive-type engine at part loads by eliminating engine throttling altogether and controlling the intake flow by heating the intake air and utilizing variable late or early intake valve closings.

11 Claims, 2 Drawing Sheets

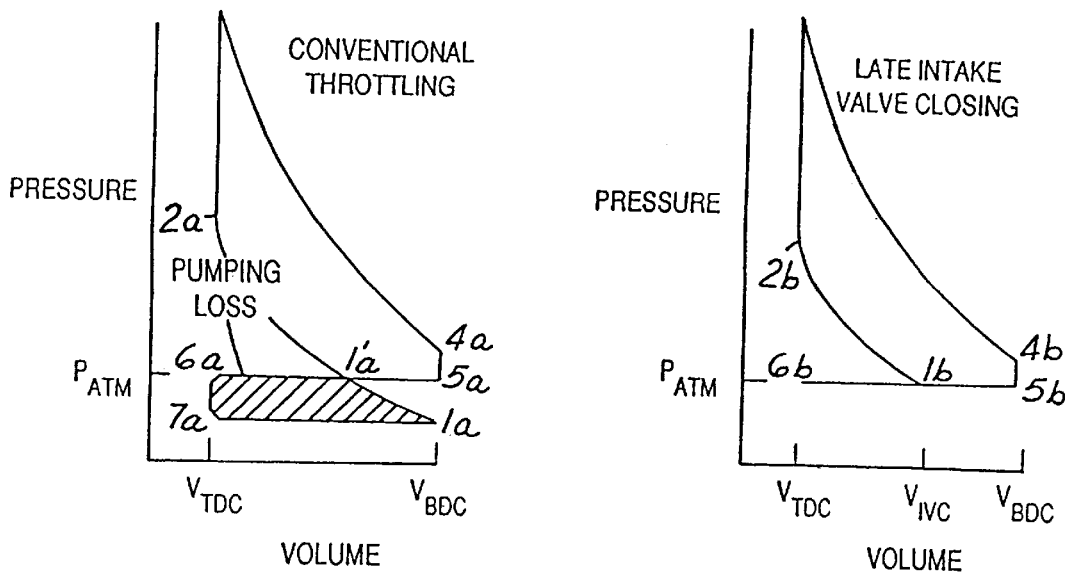
FIG. 1A
FIG. 1B
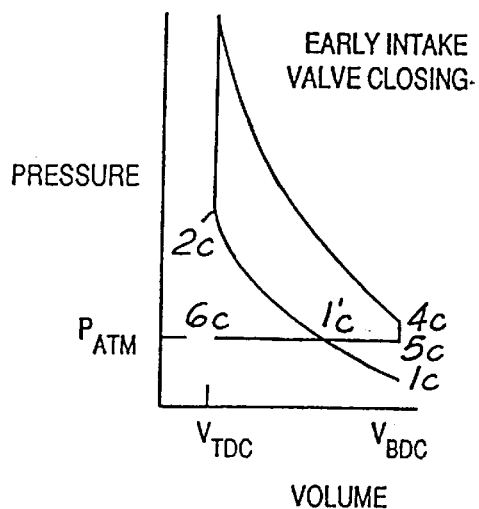
FIG. 1C
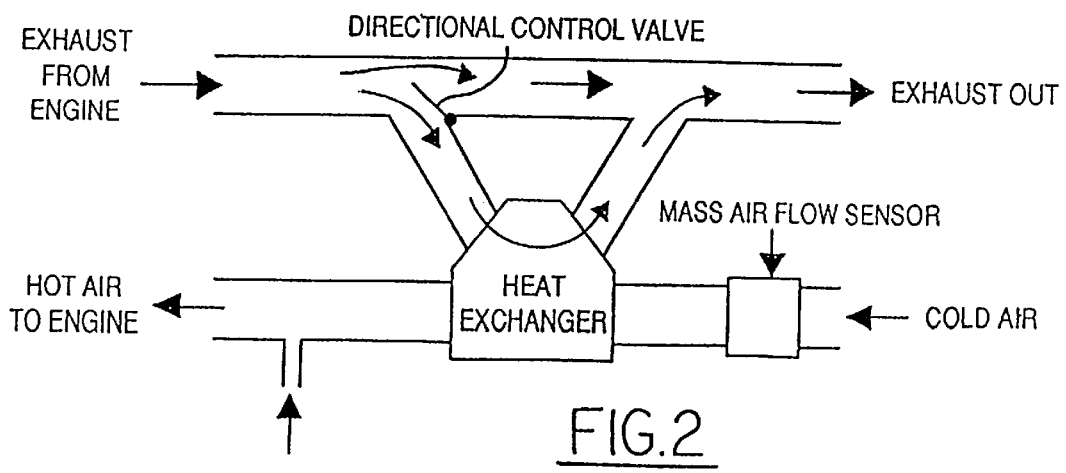
FIG. 2

UNTHROTTLED ENGINE OPERATION WITH A HEATED AIR CYCLE

FIELD OF THE INVENTION

This invention relates in general to an automotive-type engine timing system. More particularly, it relates to one in which the intake valve event is phase shifted to vary the timing and the engine is operated unthrottled with a heated air intake to compensate for the reduction in compression and temperature resulting from the shifting of the intake valve event.

BACKGROUND OF THE INVENTION

Most commercially available automotive engines use fixed lift and duration intake and exhaust valve events. As a result, there is a compromise between the best fuel economy, emission control and engine power conditions.

Potentially better fuel economy, emission control and engine output benefits can be realized and particularly at part load conditions if the engine pumping losses are eliminated or minimized. This can be realized by using unthrottled operation coupled with a phase shifting of the intake valve event from a normal schedule to close within a range of either early or late in the engine cycle as a function of the mass of charge to be trapped, and heating the intake air to compensate for a reduction in compression end temperature that results from phase shifting of the intake valve.

DESCRIPTION OF THE PRIOR ART

The prior art in general does not show an engine operation utilizing unthrottled part load operation with a phase shifting of the intake valve event coupled with heating the air intake to increase the compression end temperature to a level equivalent to that of a conventional throttled engine operating with an unheated air intake and a normal intake valve closing timing schedule.

SAE Reports Nos. 800,794 June 1980 and No. 820,408 February 1982, Tuttle, discuss the value of both early and late intake valve closings as a benefit to reduce engine pumping loss. The reports recognize that a lowering of the compression end temperature results in a lower compression ratio and a conclusion that variable density throttling need be combined with a phase shifting of the valve to produce satisfactory results. No heating of the intake air is taught or suggested.

SAE Report No. 820,352, Luria et al., February 1982, further discusses the advantages of variable valve timing, but without a solution to offset the decrease in the compression and temperature.

SAE Report No. 890,677, Saunders et al., February 1989, similarly discusses the value of variable valve timing as a load control to eliminate throttling and, therefore, engine pumping losses, combined with changes in cylinder clearance volume to increase the expansion ratio and vary the compression ratio to compensate for the change caused by the variable valve closing schedule. No mention is made or taught of adding heat to the intake air to compensate for the reduction in compression end temperature, without a need for changing the clearance volume or stroke of the engine.

U.S. 4,700,684, Pischinger et al., shows and describes an unthrottled engine operation in which the mass of fresh mixture charge changes with the load, and the load is changed by increasing the amount of exhaust gas in the cylinder in proportion to the load and the volume of oxygen or intake charge desired. Variable control of both the intake and exhaust events is used to assure that the engine cylinder is partially filled with exhaust gas at light loads with only the remaining portion of the cylinder volume available for the intake air.

In this case, mixing the intake air with substantial amounts of exhaust gas as proposed by Pischinger increases the mean temperature of the gas in the cylinder and, therefore, avoids a reduction in compression ratio and low compression end temperature, which is normally associated with late or early intake valve closing.

However, it should be noted that the use of substantial amounts of exhaust gas to fill up that part of the cylinder that is not filled with intake charge, while it will heat the intake air in the remaining volume, it will materially affect the ability to achieve reliable ignition and maintain good quality of the subsequent combustion. It is well known that although small amounts of exhaust gas, limited to no more than 10 to 15 percent, for example, of the charge can be added to the intake air without being greatly detrimental to the combustion process, diluting the intake charge with large amounts of exhaust gas leads to dramatic increases in the unburned hydrocarbon (HC) emissions. This effect is especially pronounced at low engine speeds, at which most light load operation takes place in automotive applications.

In Pischinger, at light load, at least 50 percent dilution appears to be required for the method described in the patent. In contrast, the method advanced by the invention to be described does not require dilution of the intake air with large amounts of exhaust gas and thus avoids the deterioration in mixture ignitability and inferior combustion.

SUMMARY OF THE INVENTION

The method defined by this invention eliminates engine throttling altogether, thereby eliminating or reducing engine pumping losses, and controls the intake flow at part load by heating the intake air and utilizing variable late or early intake valve closings.

The application of early or late intake valve closing results in a reduction of compression end temperature, which is detrimental to reliable ignition and efficient combustion. For a late intake valve closing, this reduction in compression causes the effective compression ratio to be reduced because during the portion of the compression stroke when the intake valve is still open the cylinder charge is being pushed or forced back into the intake port; therefore, actual compression starts only when the intake valve closes.

When variable early intake valve closing is applied during the intake stroke, the compression end temperature is still reduced because, subsequent to the closing during the later part of the intake stroke, the cylinder charge is subject to adiabatic expansion. This reduces the charge temperature, thus, the compression stroke will start with a charge temperature substantially lower than is the case with a throttled cycle.

The problem of this reduced compression end temperature can be compensated for or alleviated if the intake air is preheated to assure adequate cylinder charge temperature at the end of compression regardless of the timing of the intake valve closing. With a normal intake valve closing time and unthrottled operation, elevated intake charge temperature would be unacceptable. But with late or early closing at part load, a controlled increase in intake air temperature is both acceptable and desirable.

In addition to lifting the restriction on intake closing time, heating the intake air is, in its own right, an efficient means of controlling the mass of the intake charge. Thus, combined application of variable timing of intake valve closing and of controllable intake air heating eliminates the previously existing limitations and creates conditions for completely unthrottled engine operation at wide ranges of part loads with stoichiometric air-to-fuel ratio.

It is, therefore, a primary object of the invention to establish a method of unthrottled engine operation with variable intake valve closing events combined with a controllable heating of the intake air charge for increased fuel economy, operating efficiency and other engine output benefits.

Other objects, features and advantages of the invention will become more apparent upon reference to the succeeding, detailed description thereof, and to the drawings illustrating the preferred embodiment thereof; wherein:

BRIEF DESCRIPTION OF THE DRAWINGS

FIG. 1A is a diagram of engine or cylinder operating pressure versus cylinder volume change for a conventional throttled-type engine.

FIGS. 1B and 1C are diagrams similar to FIG. 1a relating to an unthrottled engine with heated air cycles and late and early intake valve closings, respectively, embodying the invention.

FIGS. 2 and 3 are schematic illustrations of devices embodying the invention for adding heat to the engine intake air.

DESCRIPTION OF THE PREFERRED EMBODIMENT

Figure 3:
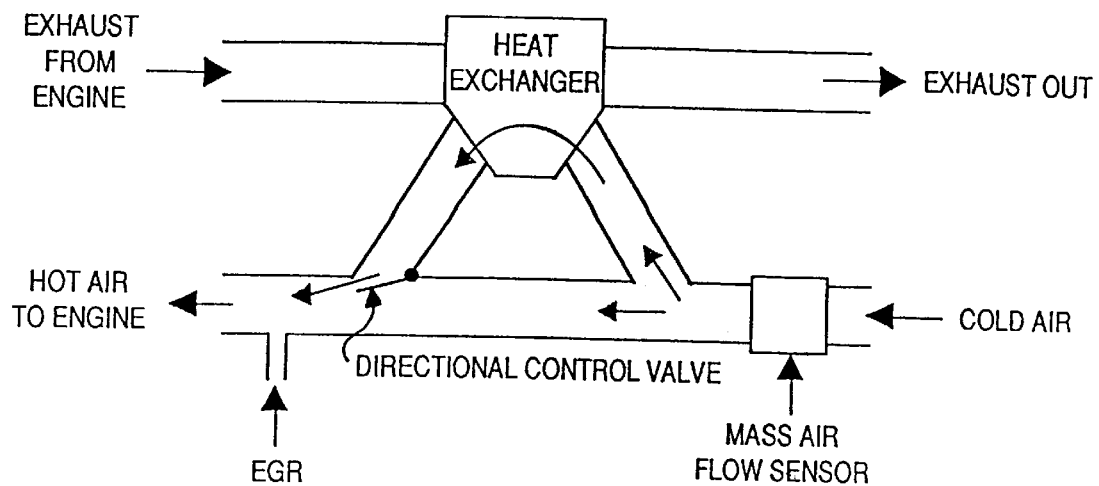

In a conventional four-stroke spark ignition engine, intake air throttling is used to control the engine air flow at part load. This has the advantage of simplicity but it also has an adverse effect on fuel efficiency by increasing the pumping loop work or loss. The method of this invention eliminates throttling altogether and controls the intake flow at part load by heating the intake air and changing the volume of trapped intake charge by varying the timing of the intake valve closing from a normal schedule. That is, it phase shifts the intake valve timing event from a normal fixed duration and lift schedule and thereby offers improved fuel efficiency compared to the conventional throttled engine operation.

FIG. 1A shows a typical pressure-volume (P-V) diagram of an ideal engine cycle for a throttled engine operation. It illustrates a conventional constant-volume combustion cycle. Starting at point 7a, at the beginning of the intake stroke, and with a closed throttle valve, the engine manifold vacuum is high. As the piston moves downwardly on its intake stroke, the intake valve is open from point 7a to point 1a, at which point it closes and begins building up pressure through point 1'a to point 2a at the end of the compression stroke. Ignition then occurs and the cylinder pressure increases to a maximum for the downward movement of the piston in the expansion stroke and opening of the exhaust valve at point 4a, with a return to atmospheric pressure at point 5a during the exhaust stroke to point 6a and subsequently to point 7a, with the increase in manifold vacuum with a closed throttle.

In contrast, as seen in FIG. 1B, with unthrottled engine operation and a heated air intake, the intake valve opens during the intake stroke at point 6b at essentially atmospheric pressure and remains at that level as the piston moves downwardly along the line 1b with increasing volume to point 5b at the end of the intake stroke. The piston then starts back into the compression stroke, and the intake valve closes at point 1b at the point determined by the volume of air or charge to be trapped. The point 1b is selected so that it coincides with the location of point 1'a in FIG. A. From this point onward, the compression temperature and pressure and expansion ratio are identical to that of the throttled engine cycle in FIG. 1A.

Heating of the intake air causes the temperature at points 1b in FIG. 1B and 1'a in FIG. 1A to be identical, and, therefore, provide the unthrottled heated air cycle of FIG. 1B to be equivalent to the unheated throttled cycle of FIG. 1A. The temperature level that is required of the intake air temperature at point 1b to be identical with the temperature at point 1'a, or equivalent to it, can be derived from the conditions of equal masses, pressures and temperatures at the end of the compression stroke. These are given in equations (1) and (2) below $$T_{1b} = T_{1a}/(P_{1a}/P_{1b})^{(n-1)/n} \tag{1}$$

$$r_{cb} = r_{ca}(P_{1a}/P_{1b})^{1/n} \tag{2}$$

where $P_{1a}$, $T_{1a}$ and $r_{ca}$ are inlet pressure, inlet temperature and compression ratio in the throttled air cycle; while $P_{1b}$, $T_{1b}$, and $r_{cb}$ are corresponding parameters in an equivalent heated air cycle. n is the ratio of specific heats.

The shaded portion in FIG. 1A represents the engine pumping losses that occur during part load operation of the engine. The restriction to flow caused by a throttle valve results in a manifold vacuum level that counteracts the efforts of the piston during its downward stroke in the intake and exhaust strokes. That is, this loss represents the power required to pump charge into and out of the cylinder during the intake and exhaust strokes.

The late intake valve closing engine represented by FIG. 1B is an engine with the power output regulated by controlling the crank angle at which the intake valve closes. In this case, the intake valve opens just prior to and remains open throughout the intake stroke of the engine. However, the intake valve also remains open for a portion of the compression stroke while the piston pushes part of the cylinder charge back into the intake manifold.

After the intake valve closes, the remainder of the compression stroke, as well as the expansion and exhaust strokes, are similar to those of the conventional engine diagram depicted in FIG. 1A. In contrast to the substantial pumping losses of the conventional engine operating at part load, the late intake valve closing engine depicted in FIG. 1B operates unthrottled and inducts fresh charge at near atmospheric pressure. The throttling losses, therefore, are essentially eliminated for all load conditions.

The volume of trapped cylinder charge and, therefore, power output, is determined by the effective cylinder volume at the time the intake valve closes, which will be within a range between late in the compression stroke, as described in connection with FIG. 1B, or earlier in the intake stroke, as will now be described in connection with FIG. 1C.

FIG. 1C indicates the pressure-volume diagram for a heated air intake, unthrottled engine utilizing early intake valve closing in the intake stroke of the engine. The intake valve opens just prior to the intake stroke of the piston at point 6c just as at point 6a in the case of the conventional throttled engine of FIG. 1A. In this case, as the cylinder volume increases during the intake stroke, from point 6c towards 1'c, the engine inducts fresh charge at near atmospheric pressure just as in the case of the late closing intake valve operation.

The part load power of the engine is regulated in this case by closing the intake valve during the intake stroke whenever the required mass of fresh charge has been inducted. Consequently, the trapped cylinder charge and the power output will be determined by the cylinder volume at the time of the intake valve closing. The end of the intake can be at 1'c, for example, and the beginning of the compression at point 1c, with a return to point 1'c in the compression stroke.

After the intake valve closes in this case at point 1'c, the cylinder charge expands as the piston completes the intake stroke at point 1c, and the subsequent compression, expansion and exhaust strokes through points 2c to 6c are identical to those 2a–6a of the conventional engine illustrated in FIG. 1A. Therefore, just as in case 1B, the throttling losses are essentially eliminated for all load conditions.

In summary, the throttled cycle has been compared to the heated air cycle of the invention, which produces the same pressure and temperature at the end of the compression stroke as the throttled air cycle, for an equal mass of trapped intake charge and equal expansion ratio. With equal air-to-fuel ratios, the two cycles differ only in their pumping loops and early parts of their respective compression strokes. The rest of the cycles are identical in both cases, and, therefore, are referred to as equivalent cycles.

For each throttled cycle, there is an equivalent heated air cycle that handles identical quantities of intake charge. The P-V diagram of the heated air cycle looks like that of an equivalent throttled cycle without the shaded area representing the pumping loop work. A conversion from throttled cycle to the heated air cycle permits unthrottled engine operation at part-loads with any desired air-to-fuel ratio, which in most cases would be the stoichiometric ratio.

FIGS. 2 and 3 illustrate two methods of heating the intake air. In FIGS. 2, the cold air inlet indicated passes all of the air past a mass air flow sensor into and out of one portion of a heat exchanger. Engine exhaust gas is directed into another portion of the heat exchanger by way of a gated bypass in the exhaust line as indicated, EGR can also be added to the heated intake air, if desired, for the control of NOx and other emissions. In this case, movement of the direction control valve or gate indicated will control the volume and level of heat. Any suitable engine parameter sensitive control means can be used.

FIG. 3 is an embodiment similar to FIG. 2. In this case, all of the exhaust gas flows through one side of the heat exchanger, and the temperature of the cold air in the inlet is controlled by varying the fraction of intake air passing through the other side of the heat exchanger as regulated by the directional control valve or gate.

Figure 4:
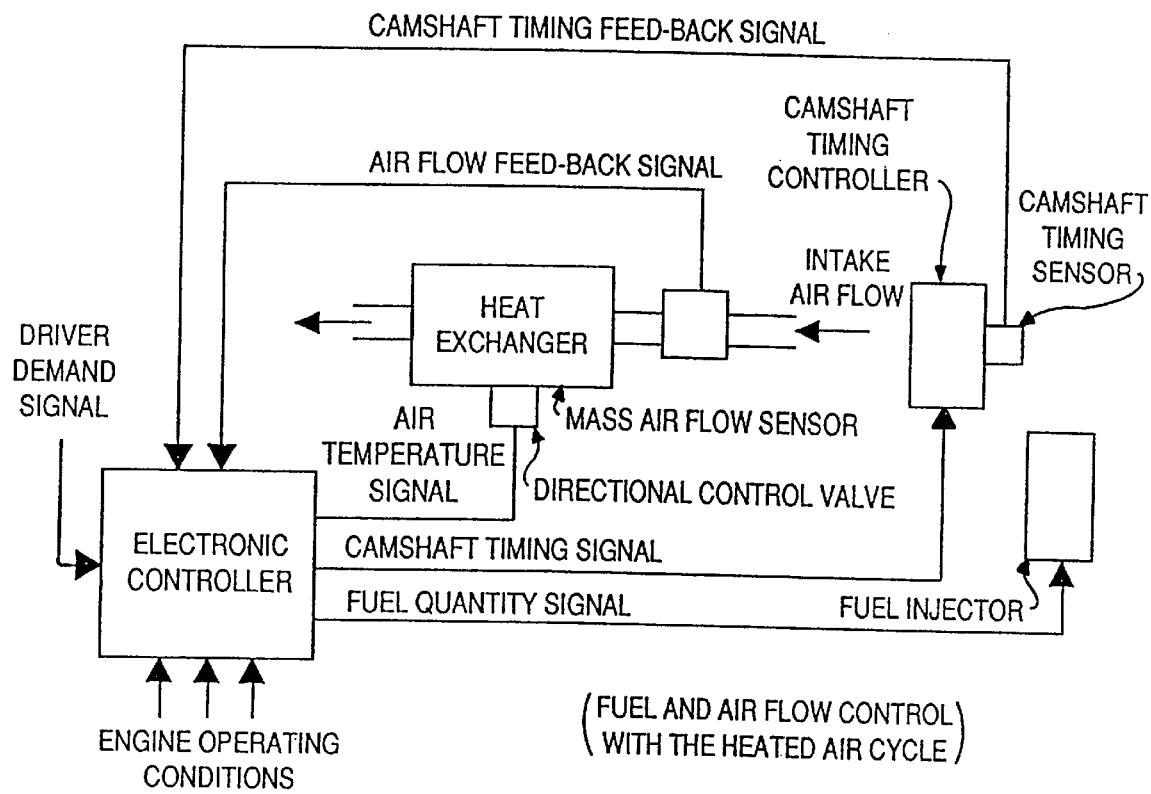
FIG. 4 is a schematic illustration of a fuel and air flow control system embodying the invention.

FIG. 4 illustrates schematically an engine control system for the heated air cycle. An electronic controller receives a driver demand signal, such as an accelerator pedal position, as well as other signals representing engine operating conditions, and, on the basis of this information, determines the required quantity of fuel and the quantity of air required to assure the needed air-to-fuel ratio. In systems using a catalyst for nitrogen oxides (NOx) reduction, the required air-to-fuel ratio is stoichiometric or nearly stoichiometric. Only for maximum engine loads would air-to-fuel ratios lower than stoichiometric be used. In addition to sending out a signal to the fuel injector controlling fuel quantity, the system computes the required intake valve closing time and intake air temperature, on the basis of strategy incorporated in the system software, and sends out control signals to mechanisms controlling the intake camshaft timing and to the heat exchanger directional control valve, as indicated. Whenever the fuel quantity is changed in response to a change in driver demand signal, a concurrent change in intake camshaft timing and in heat exchanger directional control valve position is performed. Feedback signals coming from the camshaft timing sensor and the intake air mass flow sensor provide for precise closed loop control.

From the foregoing, it will be seen that the invention provides an engine capable of unthrottled operation over a wide range of part-load conditions with constant air-to-fuel ratio. The control of the intake flow at part-loads is accomplished by heating the intake air and changing the volume of trapped intake charge by varying the timing of intake valve closing, which also varies the compression ratio.

While the invention has been described and shown in its preferred embodiments, it will be clear to those skilled in the arts to which it pertains that many changes and modifications may be made thereto without departing from the scope of the invention.

I claim:

1. A method of operating an automotive-type internal combustion engine unthrottled at part load conditions for improved efficiency and lower emissions and reduced engine pumping losses, consisting of:
    closing the intake valve in a range between approximately the middle of the engine intake stroke to late in the engine compression stroke as a function of the desired mass of incoming charge to be trapped upon closure of the intake valve, and
    heating the incoming air to a temperature that varies as a function of the mass of trapped charge whereby the temperature and pressure at the end of compression of the unthrottled charge are equivalent to the temperature and pressure attained during the operation of a throttled engine with unheated air and a normal intake valve closing schedule for the same mass of trapped air charge.

2. A method as in claim 1, wherein a normal exhaust valve timing event/schedule is maintained without a change in the event.

3. A method as in claim 1, wherein the level of heating the incoming air varies as a function of the point in the engine cycle when the intake valve is closed.

4. A method as in claim 1, wherein the level of heating the incoming air varies as a function of the point in the engine cycle in the compression stroke when the intake valve is closed.

5. A method of operating an automotive-type internal combustion engine at part-load conditions for improved efficiency and lower emissions and reduced engine pumping losses, consisting of:
    providing for the intake of air without throttling to eliminate engine pumping losses,
    varying the intake valve event from a normal fixed timing schedule to close the intake valve earlier than normal and in the intake stroke to define a pre-determined volume of trapped air that is subjected to adiabatic expansion during the final portion of the intake stroke that reduces the compression end temperature, and
    heating the incoming air to a level that at the end of compression is equal to the temperature level that would be obtained at the end of compression by an equal mass of air trapped during the compression stroke by an engine having unheated air and a throttled air intake and a normal intake valve closing timing schedule.

6. A method as in claim 5, wherein a normal exhaust valve timing event/schedule is maintained without a change in the event.

7. A method as in claim 5, wherein the level of heating the incoming air varies as a function of the point in the engine cycle when the intake valve is closed.

8. A method of operating an automotive-type internal combustion engine unthrottled at part load conditions for improved efficiency and lower emissions and reduced engine pumping losses, consisting of:

varying the intake valve event from a normal fixed timing schedule to maintain the intake valve open longer than normal in the compression stroke to drive back incoming air into the intake port thereby reducing the volume of the air trapped in the cylinder, closing the intake valve later than normal in the compression stroke to define a predetermined volume of trapped air that resultingly will be at a lower than normal compression end temperature for the volume of air trapped, and heating the incoming air to compensate for the reduction in temperature due to late closing of the intake valve, the heating being to a level which at the end of compression is equivalent to the temperature level that would be obtained at the end of compression by an equal mass of air trapped during the compression stroke by an engine having a throttled air intake with unheated air and a normal intake valve closing timing schedule.

9. A method as in claim 8, wherein a normal exhaust valve timing event/schedule is maintained without a change in the event.

10. A method as in claims 8, wherein the level of heating the incoming air varies as a function of the point in the engine cycle when the intake valve is closed.

11. A method as in claim 8, wherein the level of heating the incoming air varies as a function of the point in the engine cycle in the compression stroke when the intake valve is closed.

* * * * *